(12) United States Patent
Randriamasy

(10) Patent No.: US 9,124,586 B2
(45) Date of Patent: Sep. 1, 2015

(54) CONFIDENTIAL OR PROTECTED ACCESS TO A NETWORK OF NODES DISTRIBUTED OVER A COMMUNICATION ARCHITECTURE WITH THE AID OF A TOPOLOGY SERVER

(75) Inventor: Claire-Sabine Randriamasy, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 312 days.

(21) Appl. No.: 13/805,746

(22) PCT Filed: Jun. 27, 2011

(86) PCT No.: PCT/FR2011/051483
§ 371 (c)(1),
(2), (4) Date: Apr. 10, 2013

(87) PCT Pub. No.: WO2012/004492
PCT Pub. Date: Jan. 12, 2012

(65) Prior Publication Data
US 2013/0219062 A1    Aug. 22, 2013

(30) Foreign Application Priority Data

Jul. 8, 2010 (FR) ..................................... 10 55576

(51) Int. Cl.
*G06F 15/173* (2006.01)
*H04L 29/08* (2006.01)
*H04L 29/06* (2006.01)

(52) U.S. Cl.
CPC ............ *H04L 67/10* (2013.01); *H04L 63/1441* (2013.01); *H04L 67/101* (2013.01); *H04L 67/141* (2013.01); *H04L 67/28* (2013.01); *H04L 63/10* (2013.01)

(58) Field of Classification Search
CPC ............ H04L 41/0803; H04L 41/0806; H04L 41/085; H04L 41/12
USPC .......................... 709/203, 217, 218, 219, 225
See application file for complete search history.

(56) References Cited

U.S. PATENT DOCUMENTS 6,757,365 B1 * 6/2004 Bogard ...................... 379/88.17
7,089,310 B1 * 8/2006 Ellerman et al. .............. 709/227

(Continued)

OTHER PUBLICATIONS

Seedorf NEC E Burger Neustar Inc J: "Application-Layer Traffic Optimization (ALTO) Problem Statement; rfc5693.txt", Application—Layer Traffic Optimization (ALTO) Problem Statement; RFC5693.TXT, Internet Engineering Task Force, IETF; Standard, Internet Society (ISOC) 4, Rue Des Falaises CH-1205 Geneva, Switzerland, Oct. 1, 2009, XP015065705, abstract.

(Continued)

*Primary Examiner* — Liangche A Wang
(74) *Attorney, Agent, or Firm* — Harness, Dickey & Pierce, P.L.C.

(57) ABSTRACT

System for access to an application distributed over a network of nodes deployed on a communication architecture (A), by a client (C) connected to this architecture. It comprises a server (S) having means for providing on the request of the client information about a set of nodes of the network (Np) taking into account the topology of the network within the communication architecture. It furthermore comprises at least one relay device (R) able to receive the information and at least one mediation device (M) suitable for establishing communications between the client (C) and at least some of the nodes of the set which are determined on the basis of the information provided by the relay device or devices (R).

7 Claims, 2 Drawing Sheets

(56) References Cited

U.S. PATENT DOCUMENTS

| | | | |
|---|---|---|---|
| 7,286,521 B1 * | 10/2007 | Jackson et al. | 370/352 |
| 2002/0135610 A1 * | 9/2002 | Ootani et al. | 345/734 |
| 2005/0125492 A1 * | 6/2005 | Yu et al. | 709/203 |
| 2006/0245431 A1 * | 11/2006 | Morris | 370/395.4 |
| 2008/0140618 A1 * | 6/2008 | Kumar | 707/3 |
| 2008/0189256 A1 | 8/2008 | Kumar | |

OTHER PUBLICATIONS

International Search Report PCT/ISA/210 for International Application No. PCT/FR2011/051483 dated Sep. 22, 2011.

* cited by examiner

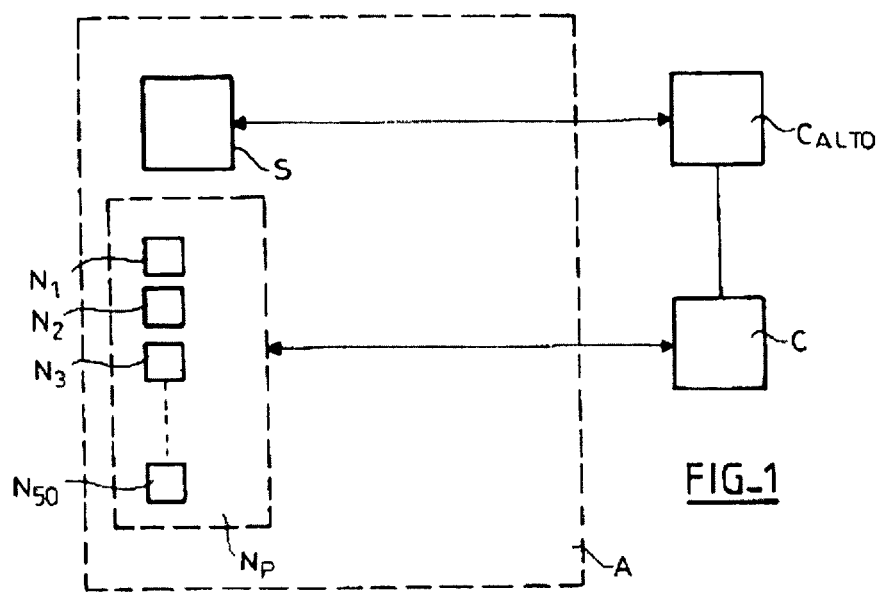
FIG_1
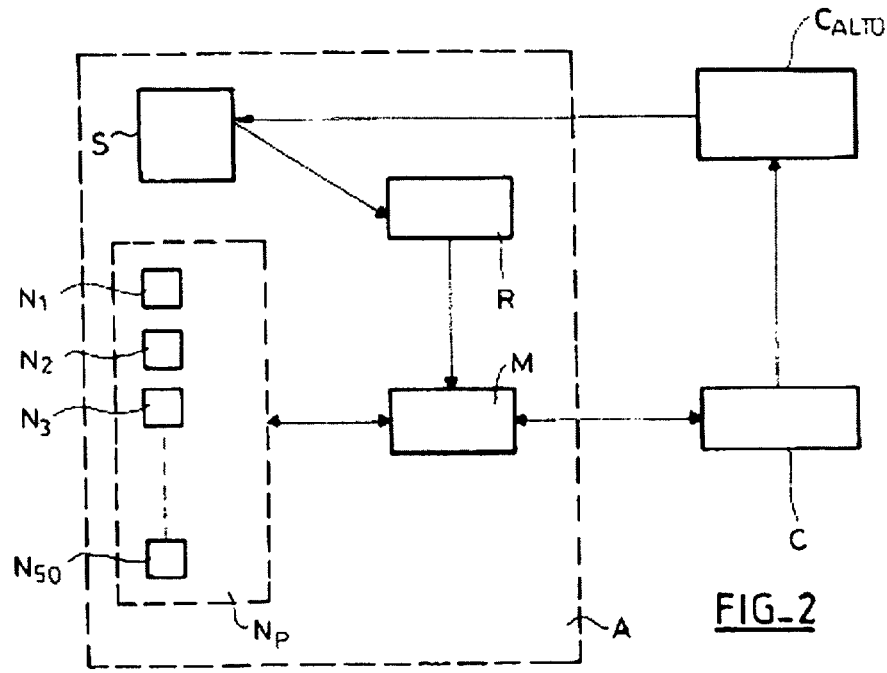
FIG_2

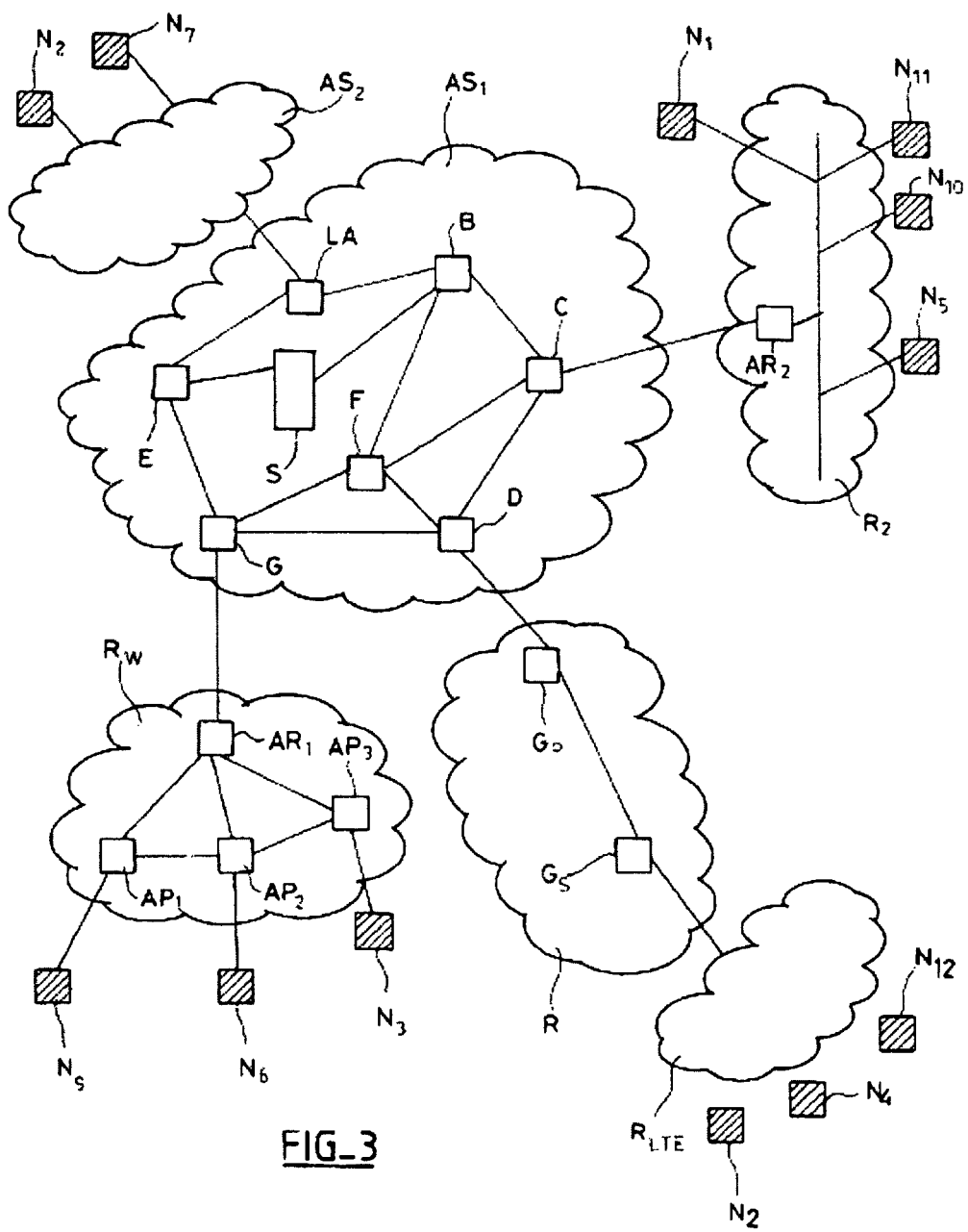
FIG_3

CONFIDENTIAL OR PROTECTED ACCESS TO A NETWORK OF NODES DISTRIBUTED OVER A COMMUNICATION ARCHITECTURE WITH THE AID OF A TOPOLOGY SERVER

The present invention relates to applications distributed across a network of nodes deployed over a communication architecture.

These applications comprise applications called "peer to peer" (or p2p) but also CDN (Content Delivery Network) networks which are made up of computers networked over the Internet, and which cooperate in order to provide content or data (generally, large multimedia content) to users.

This type of network is made up of:
- origin servers, in which the content is "injected" into the CDNs to be replicated;
- storage nodes (whether permanent or not) geographically distributed on Internet "edges", in which the content is replicated;
- a semantic routing mechanism ("name-based routing") that allows a user request for a piece of content to be served by the "closest" node, in the semantic sense These distributed applications also comprises "computing grids", more commonly known as grids, which are virtual infrastructures made up of a set of computer resources that are potentially shared, distributed, heterogeneous, remote, and independent.

Other types of applications may also be included within the scope of the invention.

These distributed applications share the same characteristic of joining application nodes into a network ("overlay"), based on their content, or their semantic characteristics, but without caring about the topological characteristic of the underlying communication architecture.

This independence between the logical structure and hardware architecture has advantages, but also at least one major drawback, because the deployment of the network of application nodes does not take into account that communication architecture's topology.

Rather, two nodes can be neighbors within the network of nodes based on purely application and semantic criteria, but be deployed in remote communication networks. A situation in which one node is located in one continent and its neighbor in another is not rare.

The result is not only an increase in end-to-end transmission times and a degradation in the general performance of the network of nodes, but also, owing to the use of many remote connections, a congestion of the Internet network as a whole.

Another problem is that this requires that operators allow unbilled traffic to travel through their networks. This requires some operators to add size to their networks or downgrade the quality of service assigned to that traffic.

Proposals have been made to improve the situation. One of these proposals is the "ALTO" (Application-Layer Traffic Optimization) service studied by a standardization group within the IETF (Internet Engineering Task Force).

The principle of this proposal is illustrated by FIG. 1 and relies on a server S that has a partial view of the communication architecture A. This server S, which complies with the ALTO standard, allows ALTO clients $C_{ALTO}$ to obtain information about a set of nodes N1, N2, N3 . . . N50 of the network of nodes Np that takes into account this partial view. This view is partial in the sense that it only covers one region of the communication architecture, and it is centered on the operator of a given independent system whose view of the Internet network it represents.

As described in section 2.2 of the document draft-ietf-alto-protocol-04.txt, a region may be an independent system, a network managed by an Internet service provider (ISP), or a subnetwork or set of such networks.

The ALTO server S may offer different services to ALTO clients. It may particularly provide a map of its view of the network or provide a sequence of a set of nodes whose identifiers are transmitted to it by the ALTO client to which the application client C is connected.

This information provided by the server S takes into account the network's topology and can therefore allow clients C to set up a network of nodes (particularly a peer-to-peer network) benefiting from that knowledge. Thus, optimal networks for the transmission/delivery mechanism may be put in place.

However, this proposal suffers from a major drawback, because it requires service providers and operators to provide clients with knowledge of their communication architectures. It is possible for entities with malicious intent to make requests to ALTO servers in order to construct a complete view of the operators' communication architectures. The document RFC 5693 "Application-Layer Traffic Optimization (ALTO) Problem Statement" emphasizes this problem in its section 5.5 "Topology Hiding".

The operators, of course, have the option of providing only truncated views within the ALTO servers, but the document draft-ietf-alto-protocol-04.txt warns against this behavior in section 11.1: In such a case, the risk is that the ALTO server would no longer be able to serve its role and that the deployment of the network of nodes would no longer be optimal.

A need therefore exists to improve the situation.

The purpose of the invention is to enjoy the advantages of ALTO servers while enabling operators and Internet service providers to not disclose the topology or other sensitive information related to their communication architectures.

To do so, one object of the invention is a system for accessing an application distributed across a network of nodes deployed on a communication architecture, by a client connected to that architecture.

It comprises:
- a server compliant with the recommendations of the ALTO standardization group of the IETF, having means for providing, upon the client's request, information about a set of that network's nodes, taking into account the network's topology within the communication architecture,
- at least one relay device capable of receiving this information and
- at least one mediation device adapted to the establishment of communications between the client and at least some of the nodes of that set, these nodes being determined based on information provided by the relay device(s).

This communication may be established in two segments: first between itself and the application client; and second, between itself and the node(s) of the set.

According to one implementation of the invention, this access system may comprise at least one processing equipment implementing one of those relay devices and one of those mediation devices.

The server may comply with the ALTO specifications. The client may transmit the request to the ALTO server by means of a client in accordance with the ALTO specifications.

The information may form an ordered list of node identifiers. It may also be constituted of associations between node identifiers and cost(s).

Thus, by using a mediation device and by sending information to a relay device that communicates with that mediation device, operators and Internet service providers may provide their architectures' map data in the ALTO servers while being guaranteed that the clients themselves cannot access it.

A further object of the invention is a method for accessing an application distributed across a network of news deployed on a communication architecture, by a (application) client connected to the architecture, comprising a step of the client transmitting a request to a server that provides, in response, information about a set of nodes of the network taking into account its apology within the communication architecture.

The information is transmitted to at least one relay device, and the method further comprises a step of establishing communications between the client and at least some of the nodes of that set, those nodes being determined from information provided by at least one of the relay devices.

The communication may be established in two segments: first, between itself and the application client C (from which it collects specifications such as the number of nodes desired) and to which it will transmit the data received from the selected nodes, and then between itself and the selected nodes from which it will receive the data.

A further object of the invention is a software application comprising means for carrying out the steps of this method, whenever it is implemented by one or more data processing equipment.

The invention, its advantages and its characteristics will appear more clearly in the description of embodiments which follows, together with the attached figures.

FIG. 1, already mentioned, depicts a communication architecture that implements the ALTO protocol.

FIG. 2 diagrams a communication architecture that implements the invention.

FIG. 3 depicts one embodiment of the invention.

The view depicted in FIG. 2 is a schematic functional view. It has intentionally been simplified to make the description of the invention's principles more clear.

It represents a communication architecture A to which a client C is connected. This client C is an application client that wishes to use an application distributed across nodes N1, N2, N3 ... N50 of a network of nodes Np.

As mentioned above, these nodes have different characteristics, particularly with respect to the topology of the network. Thus, they may be located on equipment connected to the communication architecture A by different access means (Ethernet, Wifi, 3G, LTE, etc.), each having different characteristics in terms of bandwidth, availability, etc. but they may also be located within different operators' networks, and in very different geographical areas.

The application client C may be located on a telecommunication terminal. It may be a mobile telephone, a laptop computer, a personal digital assistant, or any other device that enables the user to connect to applications located on a communication architecture, such as the Internet. The applications may be networked gaming applications, file sharing applications, multimedia flow access applications, particularly for videos, shared computing applications, etc.

In a manner known per se, the application client C may recognize a list of nodes of the network Np. Different techniques exist to do so, such as for example, the use of a centralized server that offers an access point to that network. This centralized server is, for example, a "tracker" within the context of a "peer-to-peer" network Np. In a completely distributed mode, the peer nodes may be identified by peer exchange (PEX) techniques, or by a search engine.

The application client C may then transmit that list to the ALTO client $C_{ALTO}$ in the form of a service request. This ALTO client may be co-located within the communication terminal T, as well as the FIG. 2 that depicts it. It may also be located within the communication architecture, for example within the centralized server identifying the nodes of the network Np (tracker, etc. ... )

The ALTO client is a functional entity adapted to ensure the interface between an application client and an ALTO server. It particularly implements the software means that enable communication with the server in accordance with the ALTO protocol currently being specified by the IETF. It may further comprise the means for determining which ALTO servers are available within the communication architecture A to which it is connected, as well as the services that they provide.

The ALTO client $C_{ALTO}$ then transmits a service request to an ALTO server S. The requested service may be the "Endpoint Cost Service" service defined in section 3.2.4 of the document draft-ietf-alto-protocol-04.txt.

This service makes it possible to process a list of nodes and use the topological view of the communication architecture A that the server has in order to assign them a cost. The server S may respond to the service request either with the list of nodes and their associated cost, or with an ordered list based on those costs.

For example, if the client has determined the nodes N1, N3, N50 as potentially providing the requested application, it will transmit a request to the server S containing the identifiers of those three nodes and the server will either determine peers associating a cost with each node, or a list ordering those three nodes by those costs.

These characteristics result from the network's topology; the topology comprising characteristics regarding connections between equipment (number of IP hops, cost of each IP hop as a generic value or in aerial kilometers) and with regard to the application nodes themselves (identity assigned by the ALTO service, resources available, type of connectivity, etc. ... ).

These costs may take into account different criteria reflecting the quality of the bandwidth, transmission time, jitter, resources still available from the node, etc. These characteristics may be periodically measured and updated within the ALTO server S. These processes are still outside the scope of the invention itself.

According to the invention, the ALTO server S transmits the information about this set of nodes to a relay device R. This relay device is a functional entity that can be deployed in different ways by the operator of the communication architecture A. It may be a single, centralized entity, or alternatively, there may be a plurality of relay devices, for example located within equipment for accessing the communication architecture A, customer edge or provider edge, or at an intermediate distribution degree within the communication architecture A.

In all cases, this relay device is located within the communication architecture A and is controlled by its operator.

The server S may also return a response to the ALTO client $C_{ALTO}$ out of a desire for compliance with the communication protocols being used. Its response, however, does not contain any information related to the nodes that takes into account the topology of the architecture A. Such information is only sent to the relay device R, and, in any case, not outside the devices controlled by the operator.

The response to the client may contain data regarding its request's status in order to tell whether the request succeeded or not. Additionally, it may contain some general data: in the event of a partial success, the number of nodes that could be processed, etc.

Alternatively, the ALTO server might have no response but the relay device R can then send a message to the ALTO client meaning that its service request was or was not correctly processed.

The relay device R provides the information received from the ALTO server to a mediation device M. As with the relay device R, this mediation device M is a functional entity that may be centralized or distributed within the communication architecture A, preferentially within the access equipment.

Processing equipment may be provided that combined together a relay device and a mediation device. This equipment may be equipment for accessing the architecture A (controlled by the operator) or be directly connected to those access nodes, in order to minimize the excess cost caused by the exchanges with those functions. However, it is possible to have only one equipment within the architecture A, or at least within a region of that architecture.

The mediation device's role is to establish communication between the client C and the nodes of the network N determined based on the information provided by the relay device.

As explained above, this information may consist of an ordered list or an association between node identifiers and cost(s). They enable the mediation device to establish communication with only some of the nodes, based on those criteria. Likewise, the selected nodes correspond to the topology of the architecture A. They may be the closest nodes in a topological or geographic sense, or the nodes with which the connection is fastest or which have better quality of service characteristics, etc.

Furthermore, the mediation device establishes communication with the client C. From a practical viewpoint, its role is then to puts the various actors into indirect contact, so that the data flows can be transmitted between the selected nodes and the application client by means of the mediation device M.

Thus, by using relay and mediation devices, the clients C can be aware of information related to the topology of the architecture A even though that information can be used to determine the best nodes of the network N to which the client C must connect.

The mediation device M offers an additional way to optimize the data transmission/delivery mechanism in the following manner. We have seen that M receives data requested by the client C and transmits it to that client C. Likewise, the mediation device M may endorse the role of the application node serving as a cash (temporary storage location) for that data. During later data requests for that same data by application clients associated with the same mediation device M, that data may be located and transmitted more directly to clients. This is because M may be identified as a candidate storage node, for example by a direct cache search method that gives preference to the mediation device M to the extent that it was associated with the application client by means of the relay device R.

FIG. 3 depicts one embodiment of the invention.

The depicted communication architecture is made up of multiple communication networks of different natures. The references AS1 and AS2 representing independent systems of the Internet network as defined by the IETF. Only the architecture AS1 has been somewhat detailed by the representation of the network equipment A, B, C, D, E, F and G, because in the example in FIG. 3, the ALTO servers are those of AS1, in describing a topology built from the view of the Internet that the operator of AS1 has. The communication architecture AS1 has an ALTO server S.

A Wi-Fi or WLAN network is connected via an access router $AR_1$ to the network equipment D of the independent system AS1. It additionally comprises access points $AP_1$, $AP_2$, $AP_3$.

An LTE (Long Term Evolution) network $R_{LTE}$ is connected to the independent system AS, via a third-party network R that comprises a gateway $G_S$ connecting it to the network $R_{LTE}$ and a gateway $G_P$ connecting it to the independent system AS.

Finally, a local Ethernet network $R_L$ is connected to the independent system AS, by an access router $AR_2$.

The network of (application) nodes is deployed atop the entire communication architecture. It is made up of 12 nodes N1 to N12.

The nodes $N_2$ and $N_7$ are connected to the independent system $AS_2$; the nodes $N_3$, $N_6$, $N_9$ are connected to the Wi-Fi network Rw; the nodes $N_4$, $N_8$, $N_{12}$ are connected to the network $R_{LTE}$ and the nodes $N_1$, $N_5$, $N_{10}$, $N_{11}$ are connected to the network RL.

Mediation and relay devices have been integrated into equipment located close to potential clients' access points. They may be access equipment or a gateway between the access network and the core network. In the example deployment in FIG. 3, these devices have been integrated into the access routers $AR_1$ and $AR_2$ and in the gateways $G_P$, and $G_S$. Depending on the configuration of the core network and access networks controlled by the operator, it is also possible to envision the deployment of relays at the Internet's edge, on the provider edge, meaning among the routers A, B, C, D, E, F, G.

The invention claimed is:

1. A system for accessing an application distributed across a network of nodes deployed on a communication architecture, by a client connected to said architecture, comprising:
    a server in accordance with the ALTO standard, configured to provide, upon a client's request, information about a set of nodes of a network taking into account said network's topology within a communication architecture, said information is constituted by associations between node identifiers and cost;
    at least one relay device configured to receive and transmit said information; and
    at least one mediation device configured to establish communications between said client and at least some nodes of said set of nodes, the nodes of said set of nodes determined from said information transmitted by the at least one relay device.

2. The system according to claim 1, comprising at least one processing device implementing one of said at least one relay devices and one of said mediation devices.

3. The system according to claim 1, wherein said client transmits said request to said server by means of a client in accordance with ALTO specifications.

4. The system according to claim 1, wherein said information forms an ordered list of node identifiers.

5. The system according to claim 1, wherein said mediation device possesses a cache function for the data transmitted to said application client.

6. A method for accessing an application distributed across a network of nodes deployed on a communication architecture, by a client connected to said architecture, comprising:
    a step of a client transmitting a request to a server in accordance with the ALTO standard, which provides, in response, information about a set of nodes of a network taking into account the topology of said network within a communication architecture, wherein said information is constituted by associations between node identifiers and cost, and said information is transmitted to at least one relay device; and a step of establishing communications between said client and at least some nodes of said set of nodes, the nodes of said set of nodes determined based on said information transmitted by the at least one relay device.

7. A non-transitory computer readable storage medium, embodying a computer program comprising means for carrying out the steps of the method according to claim 6, whenever the computer program is implemented by one or more data processing equipment.

\* \* \* \* \*